Feb. 2, 1937. R. R. BAKER 2,069,516
ELECTRICAL CONTROL SYSTEM
Filed May 1, 1935 2 Sheets-Sheet 1

WITNESSES:

INVENTOR
Rest R. Baker.
BY
Paul E. Friedemann
ATTORNEY

Feb. 2, 1937.  R. R. BAKER  2,069,516
ELECTRICAL CONTROL SYSTEM
Filed May 1, 1935  2 Sheets-Sheet 2

WITNESSES:

INVENTOR
Rest R. Baker.
BY
Paul E. Friedman
ATTORNEY

Patented Feb. 2, 1937

2,069,516

UNITED STATES PATENT OFFICE 2,069,516

ELECTRICAL CONTROL SYSTEM

Rest R. Baker, Swissvale, Pa., assignor to Westinghouse Electric & Manufacturing Company, East Pittsburgh, Pa., a corporation of Pennsylvania Application May 1, 1935, Serial No. 19,240

2 Claims. (Cl. 172—239)

My invention relates to electrical control systems for electrical motors or other electrical devices.

More particularly, my invention relates to systems of control for effecting any selected angular movement of a motor shaft, or any selected positional change of a device, intermittently, whereby hunting is prevented.

In certain devices where an operating element of a machine may deviate from a desired path of movement or mode of operation, it is desirable to reestablish the correct movement or mode of operation. With the ordinary devices or regulators utilized heretofore difficulty is encountered in stopping the regulating or controlling effect when the desired mode of operation is reestablished.

One object of my invention is to provide for controlling the operation of a machine element, or an electric motor only to such an extent as to compensate for the deviation of the machine element, or the motor shaft, from its desired operation.

Another object of my invention is to limit the compensating effect of a control for a machine element by a measure of the deviation of the element from its desired position or mode of operation.

Another and more specific object of my invention is to limit the total angular movement of a motor shaft, for any one control cycle, by the value of the deviation of a certain machine element from a desired operating position.

A still further object of my invention is to intermittently effect the operation of a motor for a sufficient number of times and amounts of angular rotation until the total angular change of the motor shaft is proportional to the deviation of a machine element from a desired mode of operation.

Other objects and advantages of my invention will become more apparent from a study of the following specification when considered in conjunction with the accompanying drawings, in which.

Figure 1:
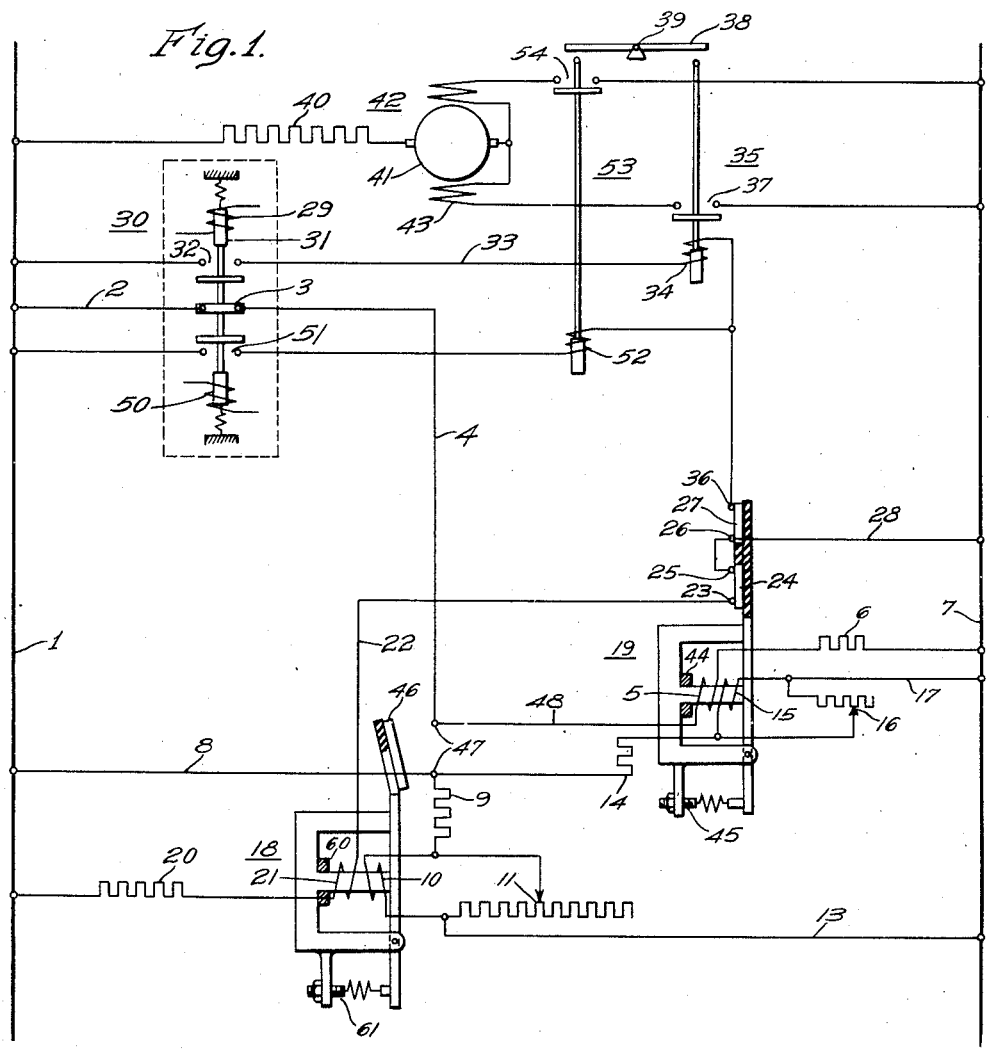
Figure 1 is a diagrammatic showing of my invention.

Referring more particularly to Fig. 1 of the drawings, the reference character 42 designates a reversible motor which is adapted to operate some device, the position or mode of operation of which is to be controlled. A regulating device, or control means 30 is interconnected with a machine element in any suitable manner and made responsive to the movement of the machine element. This control means 30 is provided with a pair of coils 29 and 50 and an armature held in the position shown by a pair of springs. The control means 30 merely illustrates one embodiment but in fact may embody any kind of regulator or device responsive to the operating characteristics of a machine. It is only necessary that the control means 30 may function as long as a certain element of a machine is not in its desired operating position or is not performing its desired mode of operation.

The motor 42, which is to be controlled in its direction of operation, is provided with a pair of directional contactors 35 and 53 which may be operated intermittently by a pair of time limit devices 18 and 19. The system of control as a whole is such that when the control means 30 is energized or caused to operate by reason of a deviation from a desired position of a certain machine element acting on the device 30, one of the directional contactors, depending upon the operation of the control means 30, will be caused to operate. The particular directional contactor that is caused to operate remains energized for a short interval of time determined by the time limit device 19. As soon as the time limit device 19 operates to deenergize the directional contactor, it also causes the deenergization of the time limit device 18 which is adjusted normally to have a time constant somewhat larger than the time constant of the time limit device 19. The time limit device 18, however, causes a reenergization of the time limit device 19 and thus a reenergization of the previously energized directional contactor.

The total effect, therefore, on motor 42 is to cause that motor to operate intermittently until the control means 30 is no longer effected by the machine element which is not in its desired operating position. Normally, the respective time constants of the time limit devices are so adjusted that the motor will be caused to operate for a comparatively short interval of time and then be at rest for a slightly larger interval of time and then again operate for a short interval of time. This cycle of operation is repeated until the motor has moved through an angle determined by the extent of deviation of the machine element, the position of which is to be controlled. The motor 42 is suitably interconnected with repositioning means for the machine element, so that the machine element is repositioned to its normal operating position and its normal mode of operation is reestablished. From the foregoing disclosure, it is apparent that there will be no hunting of the motor 42.

A better understanding of the novel features of my invention can probably be had from a study of the sequence of operation.

Assuming that conductors 1 and 7 are suitably energized. Such being the case and the control means 30 being in the position indicated, energized circuits will be established from conductor 1 through conductor 2, contact members 3, conductors 4 and 48 through the magnetizing coil 5 of the time limit device 19 and resistor 6 to the conductor 7.

Further circuits are also established from the conductor 1 through conductor 8, resistor 9 neutralizing coil 10 of the time limit device 18 and the adjustable resistor 11 connected in parallel with the neutralizing coil 10 and conductor 13 to the energized conductor 7. A circuit is also established from the energized conductor 8 through resistor 14, neutralizing coil 15 and adjustable resistor 16 connected in parallel with the neutralizing coil 15 and conductor 17 to the conductor 7. A still further circuit is established from conductor 1 through resistor 20, magnetizing coil 21 of the time limit device 18, conductor 22, contact fingers 23 and 25 bridged by the segment 24 on the armature of the time limit device 19, contact finger 26 and conductor 28 to the energized conductor 7. Since both the magnetizing coils for the time limit devices 18 and 19 are energized, the armatures of these devices will be in the position shown.

If the control means 30, responsive to the deviation of a certain machine element from a normal operating position or from a selected mode of operation, is energized, then circuits will be established for the directional contactors depending upon the direction of deviation of the machine element from its desired operating position or mode of operation.

If the coil 29 of the control means 30 is energized, the contact members 32 thereof are closed and a circuit is established from conductor 1 through contact members 32, conductor 33, actuating coil 34 of directional contactor 35, contact fingers 36 and 26 bridged by the segment 27 and conductor 28 to the energized conductor 7.

The energization of the actuating coil 34 of the directional contactor 35 will cause the closing of the contact members 37, thereby establishing a circuit for the motor 42, which circuit may be traced from the conductor 1 through a suitable accelerating resistor 40, which may be controlled in resistance value in any desired manner, through the armature 41 and field winding 43 of the motor 42, contact members 37 to the energized conductor 7. The motor 42 will thus be caused to operate in a given direction. It should be noted that the mechanical interlock 38 pivoted at 39 prevents the possibility of the closure of the directional contactor 53 at the same time the directional contactor 35 operates.

As soon as the control means 30 has become energized as hereinbefore pointed out, the contact members 3 are opened and in consequence the magnetizing coil 5 of the time limit device 19 is deenergized and this time limit device will, therefore, release its armature a definite time interval after the opening of the contact members 3. After the lapse of this definite time interval, which will of course be determined by the short circuit coil 44, the neutralizing coil 15 and the adjustment of the adjustable spring means 45, the circuit for the actuating coil 34 for the directional contactor 35 will be opened at the segment 27 and the operation of motor 42 will be stopped.

The opening of the circuit at contact fingers 23 and 25 causes the deenergization of the magnetizing coil 21 of the time limit device 18. This device will, therefore, release its armature a definite time interval after the deenergization of the coil 21. The length of the time interval will, of course, be determined by the short circuit coil 60, the neutralizing coil 10 and the adjustment of the adjustable spring means 61.

As soon as the armature of the time limit device 18 is released, the magnetizing coil 5 of the time limit device 19 is reenergized by a circuit which may be traced from the conductor 1 through conductor 8, contact fingers 47 bridged by the segment 46, conductor 48, magnetizing coil 5 and resistor 6 to the energized conductor 7. The time limit device 19 will, therefore, immediately close the circuit for the actuating coil 34 at the segment 27 and also close the circuit for the magnetizing coil 21 at the segment 24. The motor 42 will again be caused to operate for a short interval of time. After the expiration of such short time interval, the time limit device 18 will again be deenergized and the cycle will be repeated. The motor 42 will thus be caused to operate for a very short interval of time, rest or be not in operation for a short interval of time, which interval of time is normally adjusted to be longer than the operating interval of time, and then again operate for a short interval of time. The intermittent operation of the motor 42 will continue as long as coil 29 is energized, namely, as long as the machine element which causes the energization of the coil 29 is not in its desired operating position. However, the instant the energization is removed from coil 29, namely, the instant the machine element controlling the energization of coil 29 has taken its normal position, contact members 32 will be opened and the directional contactor 35 can no longer be energized. Further contact members 3 will close, therefore, establishing an energizing circuit for the magnetizing coil 5 independent of the position of the armature of the time limit device 18. The position of the apparatus will be exactly as shown in Fig. 1, and thus in condition to repeat its cycle of operation should the machine element controlling the energization of the control means 30 deviate from its desired operating position or mode of operation.

If the machine element, or motor, or whatever the device may be, should deviate in a direction opposite to that assumed in the cycle of operation hereinbefore discussed, then coil 50 would be energized closing the contact members 51, thereby energizing the actuating coil 52 of the directional contactor 53. Contact members 54 are closed to cause the motor to operate in a direction opposite to that hereinbefore assumed. The motor 42 will thus intermittently effect its compensation or repositioning of the machine element to its original position, as hereinbefore explained.

Figure 2:
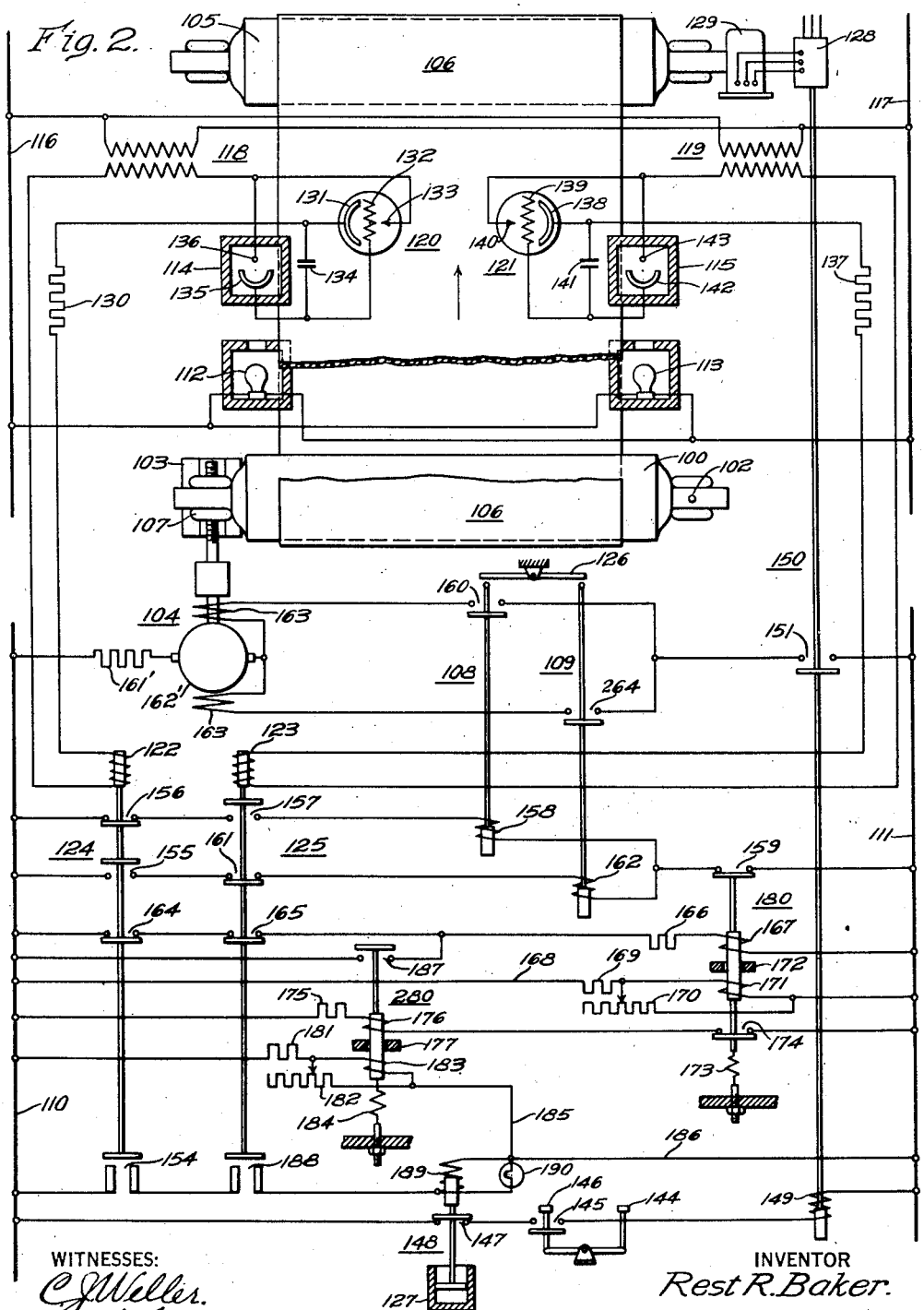
Fig. 2 is a diagrammatic showing of a specific application of my invention.

Fig. 2 of the drawings shows a specific application of my invention to the control of a Fourdrinier wire of a paper machine. This Fourdrinier wire is indicated by the reference character 106 and is adapted to traverse a plurality of rolls of which two of them are indicated by the reference characters 100 and 105.

In the art of paper making, mechanical means are provided to maintain the Fourdrinier wire in a given position or a given path of travel on the guide roll or rolls. Such devices are needed because the wire has a normal habit of meandering from side to side on the guide rolls. Such mechanical devices require considerable actuating force from the wire with the result that the wire becomes frayed at the edges and serious breakage may thus result to shorten the useful life of the wire.

My control system is well adapted to control the relative position of the guide rolls so as to maintain the Fourdrinier wire in a given path of travel. The control means shown in Fig. 2 corresponding to the control means 30 shown in Fig. 1, comprises a pair of photo-cells 114 and 115 and a pair of lights 112 and 113 associated with these respective photo-cells, disposed at the respective edges of the Fourdrinier wire. The photo-cells are suitably interconnected with electronic means 120 and 121, which, in turn, control the actuating windings 122 and 123 of the control contactors 124 and 125. The windings 122 and 123 in a sense correspond to the windings 29 and 50 of the control means 30 shown in Fig. 1.

To suitably energize the various elements of my control system, I show a pair of buses 116 and 117 which are adapted to energize transformers 118 and 119. The right-hand terminal of the secondary of transformer 118 is interconnected with the anode 133 of the electronic device 120 and is interconnected with the cathode 131 from the left-hand terminal through the actuating coil 122 and the resistor 130. The left-hand terminal of the secondary of the transformer 118, by the circuit mentioned, is also interconnected with the cathode 135 of the photo-electric cell 114 and the grid 132 of the electronic device 120, this interconnection being effected through the capacitor 134. The anode 136 of the photo-electric cell 114 is connected directly to the right-hand terminal of the secondary of the transformer 118.

The left-hand terminal of the secondary of the transformer 119 is directly connected to the anodes 140 and 143 of the devices 121 and 115, respectively. The right-hand terminal of the secondary of the transformer 119 is connected through the actuating coil 123 and resistor 137 to the cathode 138 of the electronic device 121. The grid 139 of the electronic device 121 and the cathode 142 of the photo-electric cell 115 are interconnected with the right-hand terminal of the secondary of the transformer 119 through the capacitor 141. The sources of light, namely 112 and 113, are connected directly across the buses 116 and 117.

To drive the rollers 100 and 105, representing but two of a considerable number of rollers, a main motor 129 is energized from a suitable source through the controller 128 and the line contactor 150.

To maintain the Fourdrinier wire or web 106 in a given path of travel, the roller 100 is provided with a pivotal bearing at the right pivoting about the point 102 and at the left has the bearing 107 movable in the guide 103 by the reversible motor 104. By suitably controlling the direction and extent of operation of the motor 104, the Fourdrinier wire 106 or any other web to be controlled may be maintained in a given desired path of travel. However, with my special control such repositioning of the Fourdrinier wire is accomplished by intermittent operation of the motor 104, so that the correcting effect is accomplished in small increments, the sum of which is a direct measure of the amount of deviation of the web or Fourdrinier 106 from its desired path of travel.

To accomplish this desired operation, the directional contactors 108 and 109 are controlled by the control contactors 124 and 125 and the time limit devices 180 and 280.

A better understanding of the advantages and novel results of my invention can probably be had from a study of a typical sequence of operation when it is assumed that the Fourdrinier wire 106 has deviated from its desired path of travel in one or the other direction by any amount determined by its own habits of meandering.

If buses 110 and 111 are suitably energized, energizing circuits are established from bus 110 through contact members 164 and 165, resistor 166, magnetizing coil 167 of the time limit device 180 to the energizing bus 111. Another circuit is established from the bus 110 through conductor 168, resistor 169, adjustable resistor 170 and neutralizing coil 171 connected in parallel thereto to the bus 111. The neutralizing coil 171 has a negligible effect relative to the effect of the coil 167. However, when coil 167 is deenergized, the neutralizing coil acting in conjunction with the short circuit winding 172 and the spring assembly 173 provides for the opening of the contact members 159 and 174 a predetermined interval of time after the deenergization of the magnetizing coil 167.

Further circuits may be traced from the bus 110 through resistor 175, magnetizing coil 176 and contact members 174 to the bus 111. A further circuit may be traced from the bus 110 through the resistor 181, the neutralizing coil 183 connected in parallel to an adjustable resistor 182 and conductors 185 and 186 to the bus 111. The neutralizing coil 183 has a negligible effect relative to the effect of the magnetizing coil 176. However, when the magnetizing coil 176 is deenergized, as it would be by the opening of the contact members 174, the neutralizing coil coacting with the short circuit winding 177 and the spring assembly 184 provides for the closing of contact members 187, a predetermined interval of time after the deenergization of the magnetizing coil 176. During normal operation, the time constant of the time limit device 280 is adjusted to be somewhat longer than the time constant for the time limit device 180, thereby providing a period of non-operation of the motor 104 greater than its period of operation when the web is to be adjusted or repositioned to its desired path of travel.

Assuming that the attendant wishes to start the machine, he actuates the starting push button 144, thereby closing the contact members 145 to thus establish a circuit from the bus 110 through the contact members 147 and 145, the actuating coil 149 of the line contactor 150 to the bus 111. Operation of the line contactor 150 closes the contact members 151 and by suitable means embodied in the controller 128 starts the motor 129 for driving the paper making machine. Closure of the contact members 151 does not at this stage accomplish any useful operation other than to establish a closed circuit for the motor 104 when either one of the directional contactors 108 or 109 are operated by the control contactors 124 and 125. The contactors 108 and 109 are provided with an interlock 126 to prevent the possibility of both contactors being operated at the same time.

If it be assumed that the Fourdrinier wire 106 has meandered to intercept the light passing from the source of light 112 to the photo-cell 114, the bias on the grid 132 for the electronic device 120 will be so changed that the coil 122 becomes deenergized, thereby dropping its armature, opening the contact members 156, and closing the contact members 155. The closure of the contact members 155 establishes a circuit from the bus 110 through the contact members 155 and 161, actuating coil 162 of the directional contactor 109 and contact members 159 to the bus 111.

The moment the directional contactor 109 is energized, its contact members 264 are closed and the motor 104 is energized by a circuit which may be traced from the bus 110 through the starting resistor 161', armature 162', field winding 163, contact members 264 and 151 to the bus 111.

The motor 104 will thus operate to shift the bearing 107 in such a direction as to effect a repositioning of the Fourdrinier wire or web 106 to its desired path of travel. However, my system of control is so designed that any one operation of the motor is not likely to effect a complete repositioning of the web 106 to its desired path of travel but the correction is effected by intermittent operation of the motor 104. This is accomplished by the cooperative action of the control contactors 124 and 125 and the time limit devices 180 and 280.

The deenergization of the actuating coil 122 as hereinbefore explained opens the contact members 164 and deenergizes the magnetizing coil 167. The directional contactor 109 will thus remain energized for only a comparatively short interval of time depending upon the time constant of the time limit device 180 and will then be deenergized by the opening of the contact members 159.

The downward movement of the armature for the time limit device 180 opens the contact members 174, thereby deenergizing the magnetizing coil 176. After a definite time interval which is usually chosen to be longer for the device 280 than for the device 180, the contact members 187 will close thereby reenergizing the magnetizing winding 167 independent for the time being of the position of the armature of the control contactor 124.

The magnetizing coil 167 being thus reenergized effects the closing of the contact members 159 and thus the reclosing of the contact members 264 of the directional contactor 109. The motor 104 will thus be again set in operation but will remain in operation only a short interval of time depending upon the time constant of the time limit device 180, which will again be immediately deenergized by the opening of contact members 187 by reason of the reenergization of the magnetizing coil 176 through the contact members 174. It will thus be apparent that the motor 104 will operate for a very short interval of time, rest or be prevented from operating for a short interval of time and then again operate and so on until the web has been shifted so that light is no longer intercepted from the source of light 112, whereupon the contact members 164 will close, reenergizing the magnetizing coil 167 independent of the position of the armature of the time limit device 280 but the contact members 155 will also open, thereby disconnecting the motor 104 from the buses 110 and 111.

If the web or Fourdrinier wire 106 meanders toward the right, the cycle of operation will be exactly as explained before but will be initiated in its operation by the control contactor 125 which will close the contact members 157 energizing the coil 158 of the directional contactor 108 and thus effect or cause the closure of contact members 160. The contact members 165 will also open, thereby starting the time limit device 180 which will, in turn, initiate the operation of the time limit device 280 to thus effect the intermittent operation of the motor 104. For any one deviation of the Fourdrinier 106, the motor 104 will thus be caused to operate intermittently until the web has been repositioned to its desired path of travel but will not operate to a greater extent to thus cause a hunting of the motor 104.

If any one or two, or all three of the devices such as the lights, the photo-cells or electronic devices fail at one edge of the web the corresponding devices at the other edge alone assume the control duty, whereas if two devices on opposite sides fail, then the actuating coils 122 and 123 will both be deenergized, closing contact members 154 and 188 to thus establish a circuit for the danger signal 190 and an energizing circuit for the operating means 189 of the time limit device 148, which is so designed to open the contact members 147 after a definite interval of time determined by the adjustment of dashpot 127, thereby deenergizing the actuating coil 149 which will thus cause the opening of the contact members 151 and also stop the main motor 129.

While I have in Fig. 2 disclosed my invention in conjunction with a particular application to a paper making machine, it is readily apparent that my invention is general, as shown in Fig. 1, and is not limited to a particular application but that the position or mode of operation of a machine element, regardless of the type of machine that may be utilized to deenergize the control means may be controlled by intermittent operation of a motor such as 104, or 42, which intermittent operation will continue up to and until the machine element, the position of which is to be controlled is replaced to its desired operating position.

I am, of course, aware that others particularly after having had the benefit of the teachings of my invention may readily devise other circuit diagrams for accomplishing the novel features hereinbefore set forth, but I do not wish to be limited to the specific showings herein made or illustrated in the drawings but wish to be limited only by the pertinent prior art and the scope of the claims hereto appended.

I claim as my invention:

1. In a system of control for a motor controlling the operation of a machine element having the habit of departing from a desired mode of operation, in combination, a motor, a source of energy, switching means adapted to connect the motor to the source of energy, electromagnetic inductive time limit relays adapted to energize the switching means for a predetermined interval of time and adapted to deenergize the switching means for a predetermined interval of time, and means responsive to a machine element having the habit of departing from a desired mode of operation adapted to cause the alternate operation of said last named means by a number of alternations determined by the departure of the machine element from the desired mode of operation.

2. In a system of control for controlling the mode of operation of a machine element which may depart from its desired mode of operation, in combination, a reversible motor, a source of energy, a pair of reversing switches adapted respectively to connect the motor to the source of energy for one or another direction of operation, electromagnetic inductive time limit relays adapted to energize either one of said reversing switches for a predetermined interval of time and adapted to deenergize either one of the reversing switches for a predetermined interval of time, and means responsive to the departure of the machine element from its desired mode of operation adapted to select the particular reversing switch to be operated by said time limit devices and means adapted to cause alternate operation of the time limit means to thus effect said energization and deenergization of the reversing switch selected to thus intermittently cause the operation of the reversing motor.

REST R. BAKER.